United States Patent [19]

Sparks et al.

[11] Patent Number: 4,854,781

[45] Date of Patent: Aug. 8, 1989

[54] VARIABLE RIGIDITY ELEMENT FOR TRANSFER COLUMN FOOT

[75] Inventors: Charles Sparks, Le Vesinet; Pierre Odru, Fontenay Sous Bois, both of France

[73] Assignee: Institut Francais du Petrole, Rueil Malmaison, France

[21] Appl. No.: 208,211

[22] Filed: Jun. 17, 1988

[30] Foreign Application Priority Data

Jun. 18, 1987 [FR] France ................................ 87 08563

[51] Int. Cl.$^4$ .......................... E02D 5/74; E02D 5/54
[52] U.S. Cl. .................................... 405/224; 405/195; 405/202; 166/367
[58] Field of Search ........................ 405/195, 202, 224; 166/346, 350, 359, 367; 138/109, 153, 172, 174

[56] References Cited

U.S. PATENT DOCUMENTS

| | | | |
|---|---|---|---|
| 2,130,047 | 9/1938 | Upton | 405/195 |
| 3,938,964 | 2/1976 | Schmidt | 138/174 X |
| 3,974,012 | 8/1976 | Hogarth | 138/174 X |
| 4,116,009 | 9/1978 | Daubin | 405/195 X |
| 4,188,156 | 2/1980 | Fisher et al. | 166/367 X |
| 4,248,549 | 2/1981 | Czerewaty | 405/195 X |
| 4,323,089 | 4/1982 | Kadono et al. | 138/153 X |
| 4,363,567 | 12/1982 | Van der Graaf | 405/195 |
| 4,383,554 | 5/1983 | Merriman | 166/350 X |
| 4,516,881 | 5/1985 | Beynet et al. | 405/195 |

FOREIGN PATENT DOCUMENTS

| | | | |
|---|---|---|---|
| 2317773 | 10/1974 | Fed. Rep. of Germany | 138/109 |
| 2397084 | 3/1979 | France | 166/350 |
| 2496830 | 6/1982 | France | 405/195 |

Primary Examiner—Dennis L. Taylor
Assistant Examiner—Arlen L. Olsen
Attorney, Agent, or Firm—Antonelli, Terry & Wands

[57] ABSTRACT

A variable rigidity element is provided to surround and protect a riser or transfer column installed at a water bottom and extending usually to a platform associated with production of hydrocarbons. The element is composed of a number of shells which surround the riser and two or more concentric rings of shells may be provided. The shells, preferably made of metal, are shaped to avoid contact and have an ogive end remote from the bottom installation.

5 Claims, 3 Drawing Sheets

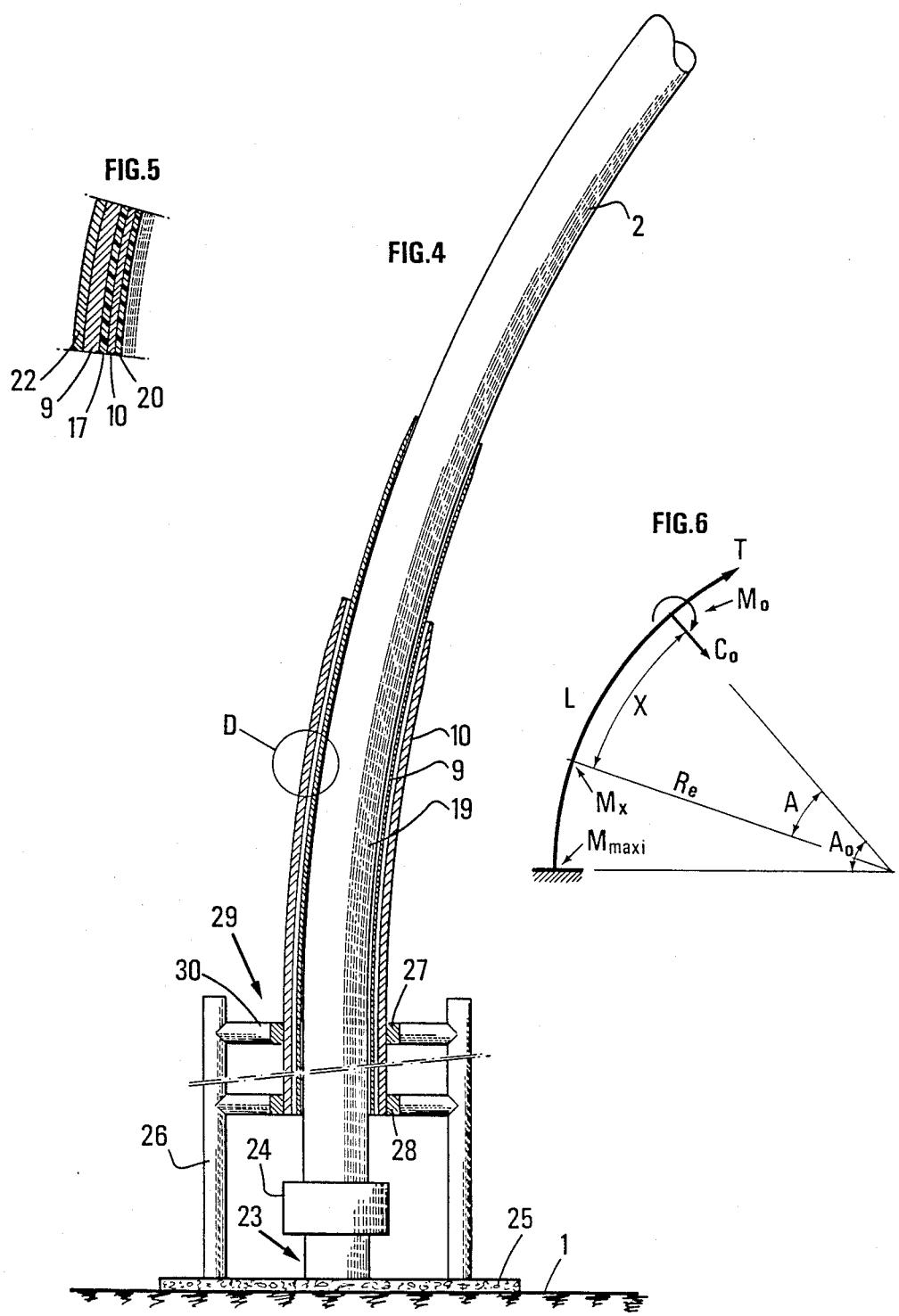

VARIABLE RIGIDITY ELEMENT FOR TRANSFER COLUMN FOOT

This invention concerns a variable rigidity element, especially for the connection of a line to a fixed point, the other end of this line being able to move and this fixed point able to exist at the water bottom.

This invention is particularly applicable to taught lines, for example, anchorage lines, petroleum production transfer lines, such as "risers".

BACKGROUND ART

Current production and drilling columns are generally linked to the seal bottom by a link composed of a pot type joint or flexible joint which allows for an angular movement of about 10° in any direction. The exception to this rule is provided by the tension-leg platform (TLP) installed on the HUTTON bed in the North Sea where production columns are embedded directly in wet wellheads which are combined on the platform vertical line.

Such embedding offers advatnages for several reasons. Firstly, it avoids imposing any significant bending on production pipes inside the column. It also reduces the angular clearances of the column. Finally, it is more compact and less expensive and requires less maintenance than a pot type joint.

Where a drilling extension piece or drilling riser is used, such a link considerably reduces the wear of rods.

The drawback of embedding is that the moments, induced by the lateral yield of the platform and via the effecft of the sea current, amy be extremely considerable. In order to reduce the bending stresses, which otherwise would exceed the limit allowed in the column, it is essential to introduce a variable rigidity element between the column and the embedding.

The element may be designed so that the curve provoked is roughly constant along its entire length. This requires that the bending ridigity (EI) moves around precisely along the element.

The data of the problem are the follow:

| | |
|---|---|
| $A_B$ = | the root angle of the column in the case of a non-rigid joint, |
| $(EI)_R$ = | the column bending rigidity, |
| $(EI)_O$ = | upper extremity bending rigidity of variable rigidity element, |
| $M_O$ = | max. permissible moment on joint between column and element, |
| $T$ = | traction force on joint and |
| $C_O$ = | shearing force on joint | and by posing $$K_R = \sqrt{T/(EI)_R}$$
$$V_R = \sqrt{T \cdot (EI)_R}$$
$$R_e = \text{min. permissible bending radius of element}$$
$$(= (EI)_O/M_O)$$
$$L = \text{length of element}$$

To best understand these designations, one should refer to FIG. 6 of this application.

It can be demonstrated that the following relations are roughly exact:

$$C_O = K_R \cdot M_O \quad (1)$$

The length (L) required for the element $$L = (EI)_O \left[ \frac{A_B}{M_O} - \frac{1}{V_R} \right] \quad (2)$$

The angle ($A_e$) for which the element must bend is $$A_e = \left[ \frac{1}{1 + \frac{(EI)_O}{V_R \cdot L}} \right] A_B \quad (3)$$

Required evolution of bending radius (EI) along element $$(EI)_x = (EI)_O [1 + K_R \cdot x] + T \frac{x^2}{2} \quad (4)$$

Max. moment at lower extremity of element $$M_{max} = M_O [1 + K_R \cdot L] + T \cdot R_e \frac{A_e^2}{2} \quad (5)$$

From the equation (2), it is deducted that the smaller is the minimum bending ridigity $(EI)_0$, the shorter may be the element.

The equation (5) shows that the maximum moment transmitted to the foundation is in direct relation with the length (L) of the element and permitted bending radius (Re). It is thus an advantage to make this element as flexible as possible.

Where the column is made from a flexible material such as, for example, a composite material (carbon fibers/glass fibers/resin) and the element consists of a stiff material, such as steel for example, it is possible that the permissible moment ($M_O$) at the joint between them is much smaller than in the element.

There are two possible solutions.

The element may be made longer than it needs to be. The alternative is to introduce a universal joint several metres long with a constant section between the column and the variable rigidity element.

The best solution in order to avoid having to introduce a universal joint between the column and variable rigidity element is to ensure that the upper extremity of the element is at least as bending flexible as the column itself. Where a column comprises composite materials (carbon fibers/glass fibers/resin), it is difficult to obtain the required flexibility. The ideal solution would be to make the element also of composite material.

Currently, it is difficult to produce such a part with the required rigidity variation.

In the case of a titanium or steel element, the required minimum thickness as regards its mechanical behaviour results in a bending rigidity much greater than that of a composite material column. This invention resolves the problem.

DISCLOSURE OF INVENTION

According to this invention, the bending rigidity of a metal element may be reduced by introducing into it longitudinal slots and imperviousness is ensured by a lining.

This lining may be designed to resist traction and pressure. Also, the slit metal part acts as a stiffener against bending.

The invention consists of surrounding a shell composite tube in metal or possibly in other materials with one or more layers.

The dimensions (width and thickness) of each shell are designed so that the evolution of the rigidity of the entire tube plus the shells along the element is that required by a variable rigidity riser foot or base, whilst observing the limit stresses of the various components of the element.

The shells may be embedded into a flexible material to protect the composite tube. They can be held together by an outer armouring.

The bending moment can be transmitted to the foundation via the composite tube connector.

It may also be transmitted there independently by creating a torque between two support points.

BRIEF DESCRIPTION OF DRAWINGS

This invention shall be better understood and its advantages shall be revealed more clearly from the description containing particular examples illustrated by the attached figures, including:

FIG. 4 shows a mode of embodiment of the base of a joint used to transfer forces to the ground, FIG. 5 shows details of the stiffener according to this invention, and FIG. 6 serves to introduce the quantities already mentioned previously.

BEST MODE FOR CARRYING OUT THE INVENTION

Figure 1:
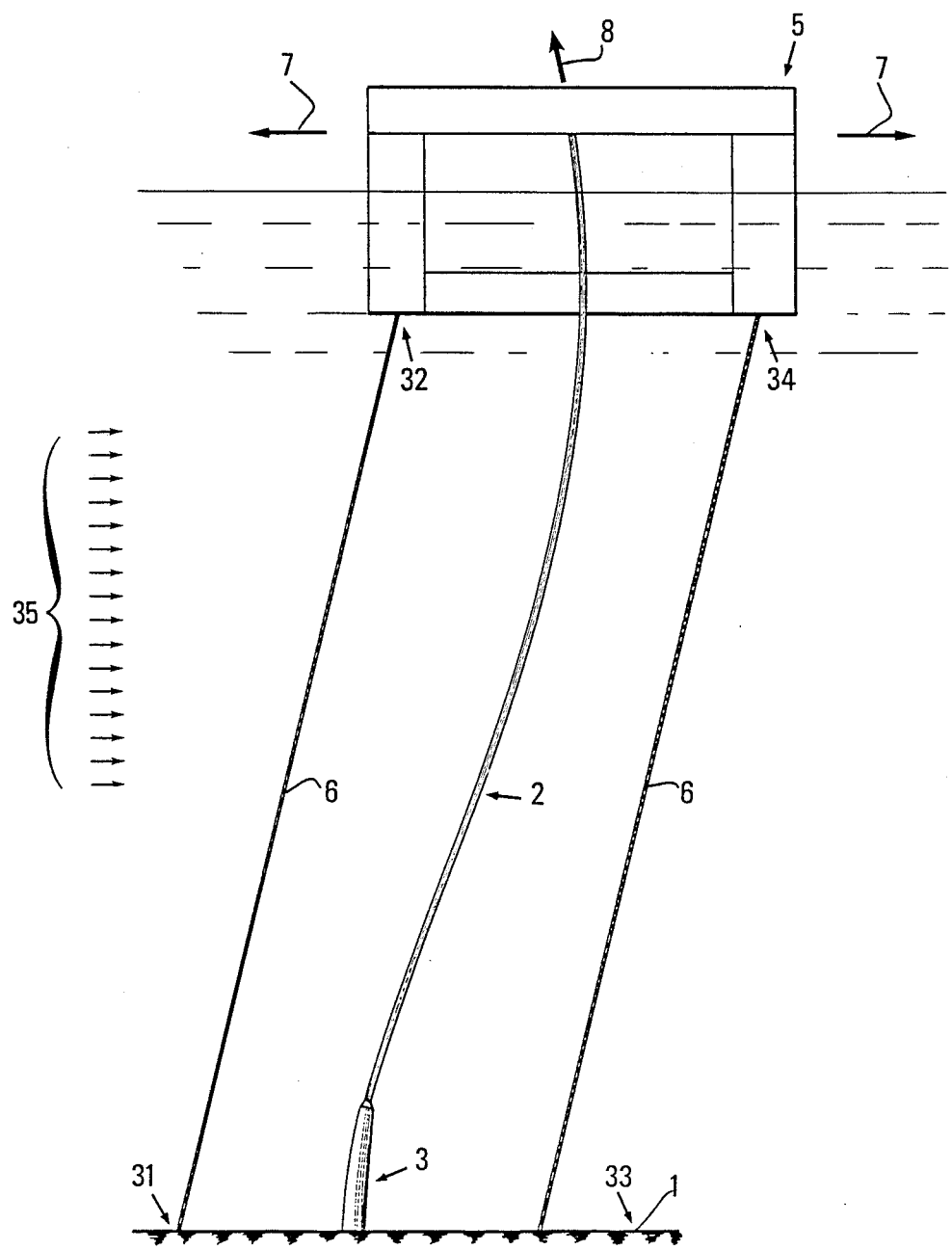
FIG. 1 represents a diagram of the entire invention which comprises a sea platform, a column and a joint for connecting the latter to the seal bottom.

On FIG. 1, reference 1 denotes the sea bottom to which shall be fixed the column 2 by means of the connection element 3 according to this invention.

Reference 4 denotes the water surface on which floats a platform 5, for example a tension-leg platform 6. The column is subjected to a traction force symbolized by the arrow 8 capable of being exerted from the platform 5.

This platform and the column are, owing especially to wind and currents 35, subject to displcements ymbolized by the arrows 7. These displacements impose a deformation of the column 2 of the type illustrated in FIG. 1. So that there displacements do not result in a quick rupture of the base of the column where it is embedded in the ground, this invention offers a low spatial requirement variable rigidity connector 3.

Figure 2:
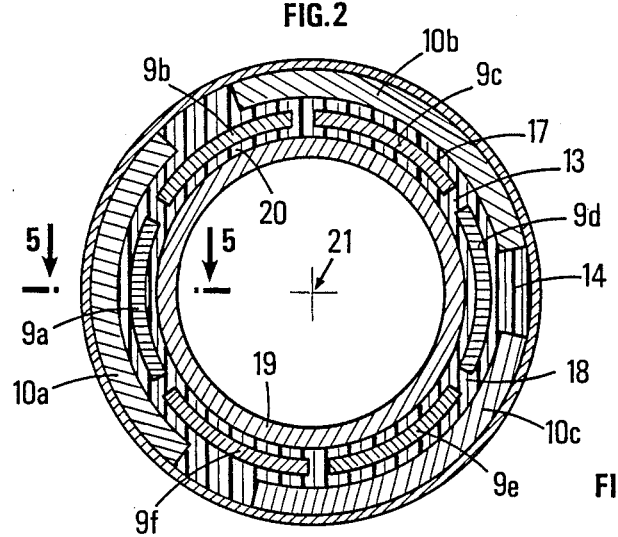
FIG. 2 and FIG. 2A represent a diagrammatic section of a joint according to this invention.

FIG. 2 illustrates a sectional drawing of the variable rigidity element comprising two layers of strips or shells respectively designated 9 and 10.

On the example shown, the first layer 9 or internal layer comprises 6 strips designated by the references 9a, 9b . . . 9f and the second layer 10 or outer layer comprises 3 strips 10a, 10b and 10c.

Figure 2A:
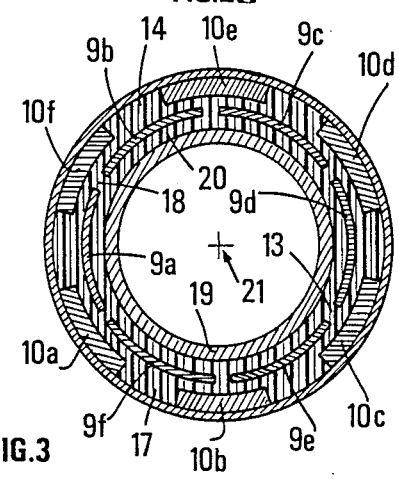

Advantageously, the outer layer could comprise strips referenced 10a, 10b . . . 10e, 10f, as represented on FIG. 2A.

Of course, the number of strips and the number of strips per layer is in no way restrictive and will depend on the materials used and the operating conditions.

Figure 3:
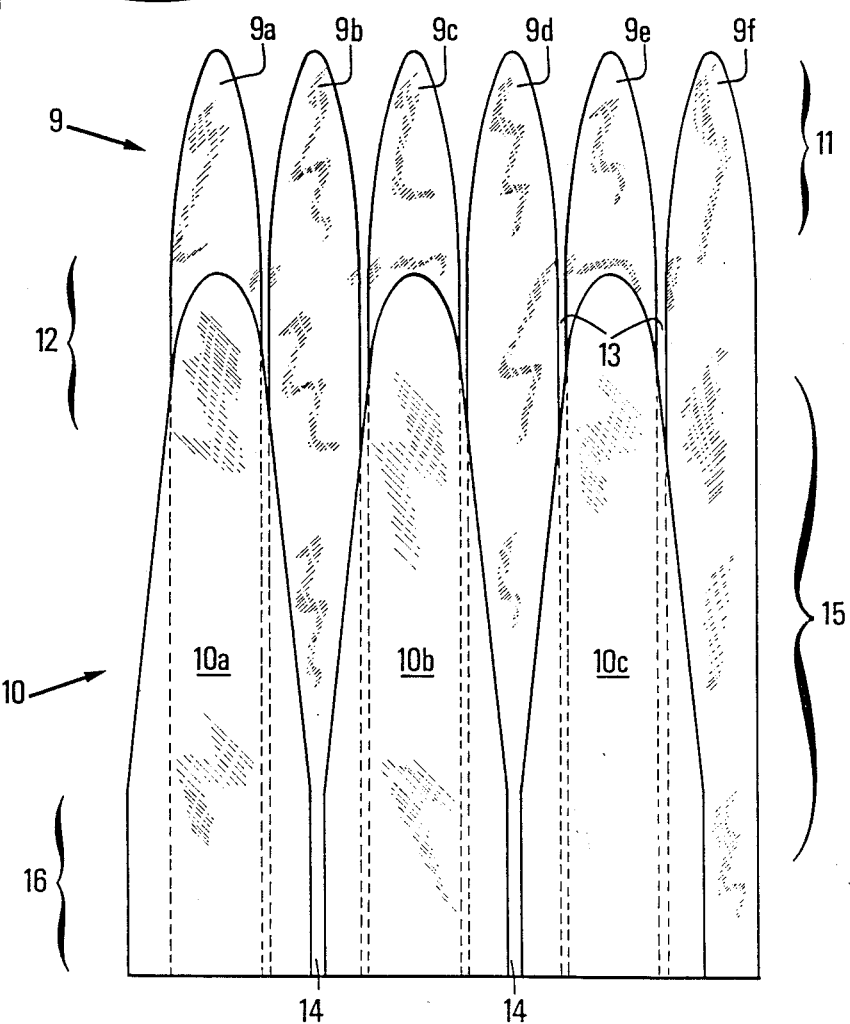
FIG. 3 is an evoluted view of the stiffener according to FIG. 2.

FIG. 3 represents the two layers of strips of evoluted views of the outside.

In the example shown in FIG. 3, the upper extremity 11 and 12 of the different strips of the layers 9 and 10 respectively have a cross section which gradually reduces as it moves away from the water bottom which is likely to be towards the base of this FIG. 3.

The strips of the internal layer 9 are higher than thoseof the outer layer 10.

On FIG. 3, it will be observed that the strips have a straight form (constant section) on their lower part 15 and 16 and that the inter-strips spaces 13 and 14 have been arranged between the strips of a given layer so as to allow for the free displacement of some of them in relation to the others so as to reduce the rubbings between strips.

For the same reasons, an inter-strips space 17 could be kept free between the inner 9 and outer 10 layers.

These inter-strips and inter-layer spaces could advantageously be filled with a ductile materail 14 such as, for example, an elastomer material.

Reference 19 denotes the imperviousness liner which ensures continuity with the column.

This liner could be made of the the same material as the column, especially when the latter includes composite materials.

It would be an advantage to keep a space between the outer wall of the imperviousness layer 19 and the layer 9 of the inner strips and this space shall be filled with a ductile material 20 allowing for the interal transfer of forces. This material could include an elastomer.

Moreover, this material could be the same as that occupying the inter-layer and/or inter-strip sapces.

This material could be moulded and/or vulcanized around the strips and layers 10 of the imperviousness liner.

On the example shown on FIG. 2, each of the inner lyaers 9 and outer layers 10 is inscribed roughly on a cylinder and are roughly coaxial to the axis 21.

Reference 22 denotes a circumferential armouring device around the outer strips of the second lyaer 10.

Of course, it is possible to introduce a ductile material, such as elastomer, between the armouring device and the second layer 10 to the extent that these two do not touch each other.

FIG. 4 shows a partial cutaway view of the variable rigidity element according to this invention and corresponding to the details shown at D on FIG. 4.

FIG. 5 shows a mode for transferring the forces exerted on the variable rigidity element at the water bottom 1.

On this figure, only the strips of the variable rigidity element have been shown. The impervious liner forms an integral part of the column 2.

The connection of the column to the bottom installation 23 is effected via a connector 24 which provides continuity with the bottom installation of the sealed space defined by the interior of the column. The traction loads are transmitted directly by the column to the seat via the connector 24.

The bending forces received by the strips of the layers 9 and 10 are transmitted to the seat 25 by roughly vertical pillars 26. These pillars can be up to four placed at the top parts of a square. These pillars are connected to at least two holding parts 27 and 28 of the lower end 29 of the variable rigidity element.

These parts, which may be rings, maintain the lower extremity of the variable rigidity element at two different levels sufficiently far away from each other so as to be able to transmit in good conditions the torque exerted on the base of the column towards the pillars 26 via the arms 30 and finally the pillars towards the seat 25.

This seat may be secured to the water bottom, possibly by stakes or piles (not shown).

It is possible to remain within the scope of this invention by using other devices for transferring the torque between the lower extremity of the variable rigidity element and the water bottom.

Similarly, the same applies if the strips are each integral with each otehr at their lower extremity and especially if they form part of a single same part.

The strips may have a constant thickness, whether they be metallic or made of another material with rigidity sufficient to transfer the torque to the seat 25.

It is also possible to remain within the context of this invention by suing the variable rigidity element at at least one of the extremeities 31, 32, 33 or 34 of the taut anchorage lines 6 of FIG. 1.

We claim:

1. A variable rigidity element allowing for connection between an extremity of a line and a fixed installation comprising:
   a plurality of shells each having an elongated form to extend along said line a distance from said installation and a cross section at the installation which has one side longer than another side;
   said shells having upper parts shaped so that two successive shells have a given circumference, said upper parts that are extremities of the shells and further from said installation being separated to avoid touching each other; and
   the upper part of at least one shell having an ogive shape.

2. An element according to claim 1 characterized in that at least one of said shells has a substantially constant thickness.

3. An element according to claim 1 having at least two layers of shells that are substantially coaxial with each layer including at least three shells.

4. An element according to claim 1, characterized in that said shells are metallic.

5. An element according to claim 1 wherein said line is a taut line extending from a sea floor installation to a locaiton at the sea surface.

* * * * *